United States Patent
Wei et al.

(10) Patent No.: US 8,816,631 B2
(45) Date of Patent: Aug. 26, 2014

(54) APPARATUS AND METHOD FOR ENERGY EFFICIENT MOTOR DRIVE STANDBY OPERATION

(75) Inventors: Lixiang Wei, Whitefish Bay, WI (US); Yogesh Popatlal Patel, Grafton, WI (US); Brian P. Brown, Mayville, WI (US)

(73) Assignee: Rockwell Automation Technologies, Inc., Mayfield Hts., OH (US)

( * ) Notice: Subject to any disclaimer, the term of this patent is extended or adjusted under 35 U.S.C. 154(b) by 326 days.

(21) Appl. No.: 13/418,775

(22) Filed: Mar. 13, 2012

(65) Prior Publication Data
US 2013/0241451 A1 Sep. 19, 2013

(51) Int. Cl.
*H02P 1/46* (2006.01)

(52) U.S. Cl.
USPC .................... 318/722; 318/801; 318/400.3

(58) Field of Classification Search
USPC .............. 318/722, 801, 400.3, 400.1, 400.34, 318/459, 811, 432
See application file for complete search history.

(56) References Cited

U.S. PATENT DOCUMENTS

| 7,489,097 | B2 * | 2/2009 | Fu et al. .................... 318/400.01 |
| 8,004,214 | B2 * | 8/2011 | Miyamoto .................... 315/307 |
| 2008/0049468 | A1 | 2/2008 | Wei et al. |
| 2009/0058350 | A1 | 3/2009 | Wei et al. |
| 2009/0196115 | A1 * | 8/2009 | Agari et al. .................... 365/226 |
| 2009/0276165 | A1 | 11/2009 | Weiss et al. |
| 2010/0078998 | A1 | 4/2010 | Wei et al. |
| 2010/0079230 | A1 | 4/2010 | Wei et al. |
| 2010/0080024 | A1 | 4/2010 | Wei et al. |
| 2011/0101897 | A1 | 5/2011 | Wei et al. |
| 2011/0103096 | A1 | 5/2011 | Wei et al. |
| 2011/0103105 | A1 | 5/2011 | Wei et al. |
| 2011/0153234 | A1 | 6/2011 | Winterhalter et al. |
| 2011/0286244 | A1 | 11/2011 | Wei et al. |
| 2011/0295437 | A1 | 12/2011 | Lu et al. |
| 2011/0309875 | A1 | 12/2011 | Wei et al. |

* cited by examiner

*Primary Examiner* — Karen Masih
(74) *Attorney, Agent, or Firm* — Fay Sharpe LLP

(57) ABSTRACT

Motor drive apparatus and methods are presented in which a standby controller uses at least one switching device to power an inverter in a normal mode and to remove power from the inverter and other motor drive components during a standby mode for improved energy efficiency.

20 Claims, 8 Drawing Sheets

APPARATUS AND METHOD FOR ENERGY EFFICIENT MOTOR DRIVE STANDBY OPERATION

BACKGROUND

The present disclosure relates generally to motor drives and more particularly to techniques and apparatus for energy efficient AC motor drive standby operation. Motor drives operate AC electrical motors using power from an AC or DC input source. In many industrial operations utilizing electric motor drives, it is useful to stop the driven motor while maintaining the drive in a standby mode for subsequent resumption of motor operation. Moreover, in controlled industrial operations, the switching between normal and standby modes may be automated, with suitable commands for entering and exiting the standby mode being generated by industrial control components interconnected with the motor drive. However, it is important to conserve energy in operation of such automated systems, and conventional standby mode operation of motor drives consumes excessive amounts of power. Thus, there remains a need for improved motor drive apparatus and techniques by which power consumption during standby operation can be reduced.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present some concepts of the disclosure in a simplified form prior to the detailed description that is presented hereinafter.

The present disclosure involves the motor drive apparatus operable in a normal mode and a standby mode. The apparatus includes a motor drive input as well is an inverter to drive a motor load. In certain embodiments, the motor drive may further include a rectifier receiving power from the drive input and providing DC output power to the input of the inverter. In other embodiments, the motor drive receives DC input power which is provided to the input of the inverter. One or more switching devices are provided between the inverter input and the drive input, and a standby controller operates the switching device to selectively allow input power to flow to the inverter in normal operation of the drive and to prevent power from flowing from the drive input to the inverter in a standby mode.

Unlike conventional standby mode operation in which the inverter and any included rectifier remained powered during standby mode, the present disclosure provides further energy conservation by preventing application of power to the inverter, and other nonessential system components may be also powered down for further energy savings during standby mode. In certain illustrated embodiments, the switching device is a main circuit breaker employed in a pre-charging apparatus which can also be used in initial startup of the motor drive for pre-charging a DC bus, whereby no new or additional hardware needs to be added to the motor drive to implement the standby mode power saving concepts of the present disclosure. In certain embodiments, moreover, a pre-charge power supply is connected to the input power upstream of the switching device to maintain power to at least one control component of the motor drive during the standby mode operation, thereby facilitating quick return to normal mode operation.

In accordance with further aspects of the disclosure, methods and computer readable mediums having computer executable instructions are provided for motor drive operation, in which electrical power is provided to one or both of the motor drive rectifier and inverter, and a standby mode command is received. In response to receipt of the standby command, operation of at least one switching device is changed to discontinue provision of electrical power to the rectifier and/or inverter. In certain embodiments, a command is received to exit the standby mode, in response to which the operating mode of the switching device is changed to resume provision of electrical power to the rectifier and/or inverter.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
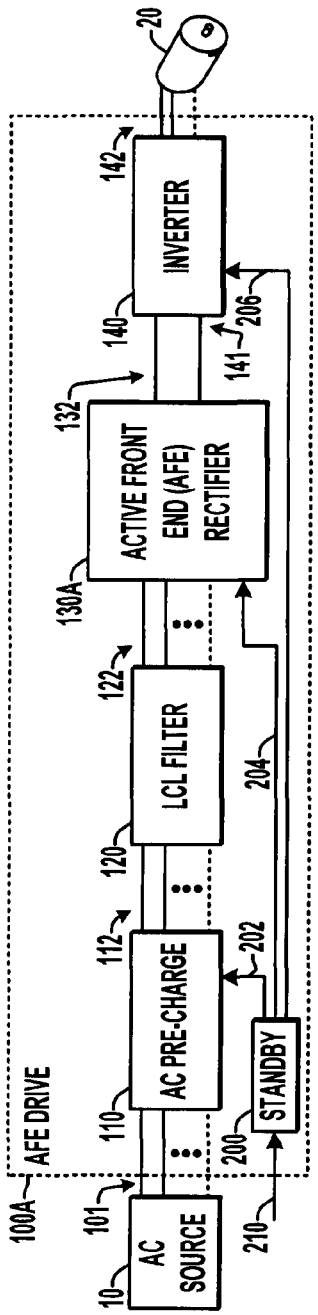
FIG. 1 is a simplified schematic diagram illustrating an exemplary active front end (AFE) motor drive including a standby controller and an AC pre-charge apparatus with a main contactor for selectively removing power from an LCL filter circuit, an active front end rectifier and an inverter in standby mode in accordance with one or more aspects of the present disclosure.

Referring now to the figures, several embodiments or implementations of the present disclosure are hereinafter described in conjunction with the drawings, wherein like reference numerals are used to refer to like elements throughout, and wherein the various features are not necessarily drawn to scale.

Referring initially to FIGS. 1-5, exemplary active front end (AFE) and fundamental front end (FFE) embodiments of an AC motor drive (100) are illustrated and described below in which input AC electrical power (single or multiphase) is received from a power source 10 and output AC electrical power (single or multiphase) is provided to an AC motor load 20. FIG. 1 illustrates an AFE drive 100A having a drive input 101 connecting the AC power source 10 to an AC pre-charge apparatus 110, and an AC output 112 of the pre-charge apparatus 110 is provided as an input to an LCL filter circuit 120. An output 122 of the LCL filter is provided as an AC input to an active front end (AFE) rectifier 130A, which in turn provides a DC output 132 as an input 141 to an inverter 140. The inverter 140 provides an AC output 142 to drive the motor load 20. In addition, the AFE drive 100A of FIG. 1 includes a standby controller 200 receiving a standby command signal or message 210 from an I/O card or other suitable input, and which generates one or more outputs 202, 204, 206 to selectively change operation of the pre-charge circuit 110, the rectifier 130 and/or the inverter 140, respectively, according to the received standby command 210. In operation, the AFE rectifier 130A operates rectifier switching devices S1-S6 (FIG. 4 below) at a relatively high frequency compared with the fundamental frequency of the AC input source 10, such as at least about twice the fundamental frequency of the source 10, and the LCL filter circuit 120 can be optionally included in AFE embodiments to filter the high-frequency switching signals associated with the switching of the rectifier 130.

Figure 2:
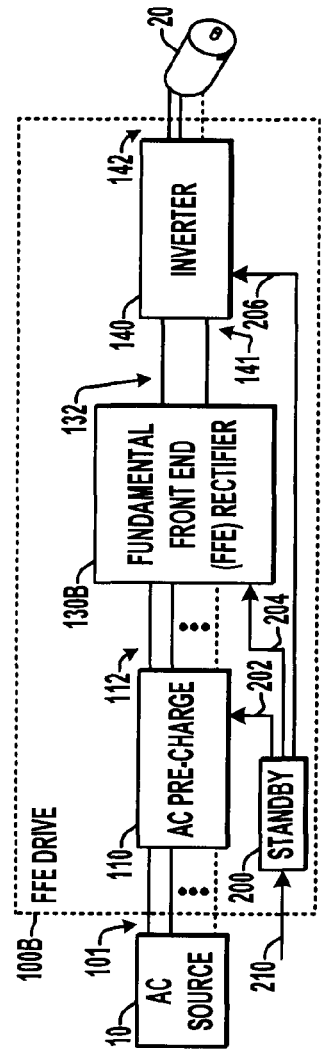
FIG. 2 is a simplified schematic diagram illustrating an exemplary fundamental front end (FFE) motor drive with a standby controller operating a main contactor to selectively remove power from a rectifier and an inverter in standby mode.

FIG. 2 illustrates a fundamental front end (FFE) motor drive embodiment 100B in which the input of the rectifier 130B is connected directly to the AC output 112 of the AC pre-charge apparatus 110 (e.g., no intervening LCL filter circuit 120 as and FIG. 1). In this FFE embodiment, the rectifier 130B includes rectifier switching devices S1-S6 (FIG. 4 below) operated at or near the fundamental frequency of the power source 10.

Figure 3:
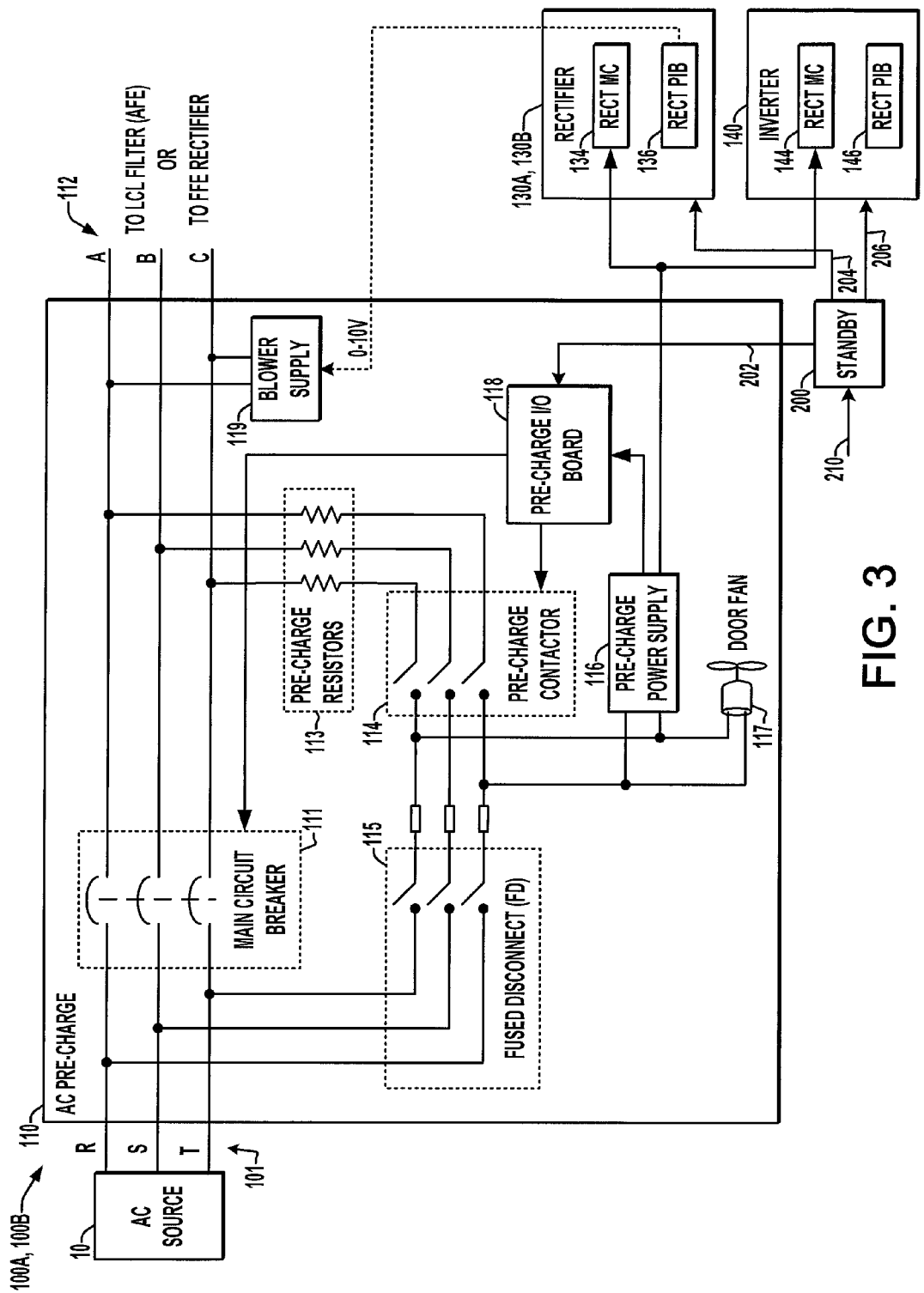
FIG. 3 is a schematic diagram illustrating further details of an exemplary AC pre-charge apparatus in the AFE and FFE motor drives of FIGS. 1 and 2 in which an AC circuit breaker is selectively opened by a standby controller receiving a standby mode command in accordance with the present disclosure.

FIG. 3 illustrates an exemplary AC pre-charge apparatus 110 provided between the drive input 101 and the downstream rectifier 130 and inverter 140 in the AFE and FFE motor drives 100 of FIGS. 1 and 2. The pre-charge apparatus 110 includes a main circuit breaker (switching device) 111 having three contacts connected between the drive input lines "R", "S", and "T" and pre-charge output terminals "A", "B", and "C". The circuit breaker 111 is operable in a first mode to allow input power to flow from the power source 10 to the rectifier 130/inverter 140 and in a second mode to prevent input power from flowing from the power source 10 to the rectifier 130/inverter 140, where the mode of the circuit breaker 111 is set according to an input signal from a pre-charge I/O board 118. In this manner, the breaker 111 closes the connections between the RST input lines and the ABC output lines connected to the subsequent LCL filter 120 (in the AFE embodiments of FIG. 1) or directly to the FFE rectifier 130B in the embodiment of FIG. 2.

The AC pre-charge apparatus 110 in FIG. 3 also provides various circuitry for precharging the DC bus capacitors C of the rectifier 130 (FIG. 4), such as at power up or in certain embodiments following resumption of normal mode after a proceeding switch-over to standby mode. In particular, the pre-charge apparatus 110 of FIG. 3 includes a pre-charge circuit with a pre-charge contactor 114 connected in series with corresponding pre-charge resistors 113 between the input lines RST and the output lines ABC in parallel with the circuit breaker 111. In addition, the illustrated embodiment further includes a fused disconnect (FD) 115 with 3 connections that are normally closed, but will become open circuits in the event of excessive current flow through the pre-charge circuit. In certain embodiments, moreover the fused disconnect 115 may be omitted.

The pre-charge apparatus 110 of FIG. 3 also includes a pre-charge power supply 116 having two AC input lines connected between the fused disconnect 115 and the pre-charge contactor 114, as well as a door fan 117 which also receives input power from the "R" and "T" input lines downstream of the fused disconnect 115, but upstream of the pre-charge contactor 114. The pre-charge power supply 116 provides one or more DC outputs, such as +24 VDC in certain embodiments, to provide control power to the pre-charge I/O board 118 as well as providing control power to main control (MC) boards 134 and 144 of the rectifier 130 and of the inverter 140, respectively.

As seen in FIG. 3, moreover, the standby controller 200 provides an input signal or message 202 to the pre-charge I/O board 118 of the pre-charge apparatus 110, which in operation causes the pre-charge I/O board 118 to change the operating mode of the main circuit breaker 111. In particular, when the standby controller 200 receives an input command 210 indicating a desired change into the standby mode operation for the motor drive 100, the signal 202 is provided to the pre-charge I/O board 118 so as to open the main circuit breaker 111, while maintaining the pre-charge contactor 114 also in the open condition. In this standby mode, power is still applied via the fused disconnect 115 from the drive input 101 to the pre-charge power supply 116 and to the door fan 117, whereby the pre-charge I/O board 118 is provided with DC power from the power supply 116. As further illustrated in FIG. 3, the standby controller 200 provides a signal 204 to the rectifier 130 and provides a signal 206 to the inverter 140 by which these systems 130, 140 cease switching operation while maintaining control power from the pre-charge power supply 116 to allow quick resumption of normal mode as discussed further below. At the same time, however, the downstream LCL filter 120 (in the case of an AFE drive as in FIG. 1 above) as well as the rectifier 130 and inverter 140 are disconnected from the input lines RST via the circuit breaker 111 during standby mode operation. In particular, this causes the DC link voltage at the rectifier output 132 and the inverter input 141 to begin decreasing.

In addition, as seen in FIG. 3, a blower supply 119 is also connected with two of the AC power lines ("A" and "C" in the illustrated example), but the supply 119 is effectively turned off by the I/O board 118 opening the circuit breaker 111 (while maintaining the pre-charge contactor 114 also in the open state) during standby mode operation. In certain embodiments, the blower supply 119 provides powers to one or more air circulation devices (not shown) within the motor drive 100 during normal operation, and the discontinuance of power to these devices further reduces power consumption in the motor drive during standby mode. In certain embodiments, the blower supply 119 includes a control input receiving a 0-10 V control signal from the PIB board 136 of the rectifier 130, although not a strict requirement of all embodiments. It is noted that in the illustrated embodiment, the door fan 117 remains powered during the standby mode operation, by which a certain amount of cooling can be provided to mitigate overheating of the powered control circuitry (e.g., pre-charge I/O board 118 and pre-charge power supply 116). However, this is not a strict requirement of the present disclosure, and in other embodiments the door fan 117 may be omitted or may be connected with two of the to the AC output lines ABC so as to be turned off during standby mode by operation of the circuit breaker 111.

In the embodiments of FIGS. 1-3, the AC circuit breaker 111 of the pre-charge apparatus 110 is used for selective power reduction during standby mode, and also functions in conjunction with the pre-charge contactor 114 for pre-charging functions in the motor drive 100. In this regard, the use of the circuit breaker 111 for the disclosed standby mode power reduction functions advantageously employs the breaker 111 without having to introduce new components in the motor drive 100. In other possible embodiments, however, a separate switching device can be used to selectively discontinue provision of input power from the power source 10 to the rectifier 130 and/or inverter 140 during standby mode operation. In addition, although illustrated in the context of three-phase input power from the source 10 and three-phase intermediate AC power provided to the LCL filter 120 (FIGS. 1) and to the AFE or FFE rectifiers 130, other embodiments are possible in which single and/or multiphase AC power can be used. In addition, while the illustrated embodiments provide three-phase output power from the inverter output 142 to the motor load 20, other embodiments are possible in which the inverter 140 provides single or multiphase AC output power to drive a motor load 20.

For embodiments equipped with the pre-charge apparatus 110, the motor drive 100 (whether AFE or FFE) is operable in one of three modes. In each of these modes, the fused disconnect 115 is typically closed, and the contacts thereof will be opened only upon occurrence of an excess current condition. In the normal operating mode, the pre-charge I/O board 118 maintains the main circuit breaker 111 in the closed position (thereby allowing input power to flow from the power source 10 to the precharge output terminals 112), but maintains the pre-charge contactor 114 in the "open" condition, whereby no current flows through the pre-charge resistors 113. In a "pre-charge" mode, the I/O board 118 switches the main circuit breaker 111 into the "open" condition and closes the pre-charge contactor 114, whereby current flows from the AC source 10 through the pre-charge resistors 113 to the pre-charge output terminals 112. This facilitates control of excessive current spikes to charge capacitance C of a DC bus formed by the output 132 of the rectifier 130 and/or at the input 141 of the inverter 140 (e.g., FIGS. 4 and 5 below). In operation, the pre-charge I/O board 118 may be provided with one or more feedback signals by which a DC link voltage VDC can be monitored, and once this exceeds a predetermined threshold voltage, the I/O board 118 closes the main breaker 111 and opens the pre-charge contactor 114 to enter the normal mode of operation.

In addition to the "normal" and "pre-charge" modes, the motor drive 100 can be placed into a "standby" operating mode, for example, in response to receipt of a command 210 by the standby controller 200. In the illustrated embodiments, the "standby" mode can be entered from the "normal" mode, with the standby controller 200 providing a signal 202 to the pre-charge I/O board 118. In response, the I/O board 118 maintains the pre-charge contactor 114 in the "open" condition, and switches the main circuit breaker 111 into the "open" condition. As discussed above, this disconnects the blower supply 119 as well as the downstream systems coupled with the pre-charge output terminals 112 from the AC input source 10, but maintains input power to the pre-charge power supply 116 and the door fan 117. In this standby condition, therefore, the pre-charge power supply 116 provides power to the pre-charge I/O board 118 as well as to the MC boards 134 and 144 of the rectifier 130 and inverter 140, respectively. This is in contrast to conventional AFE and FFE motor drive operation in which standby mode merely discontinued the switching operation of the rectifier switches S1-S6 (FIG. 4 below) and of the inverter switches S7-S12 (FIG. 5). Thus, the illustrated standby controller 200 effectively shuts down all nonessential components of the drive while maintaining control power sufficient to allow quick reentry into the normal operating mode if needed. In certain embodiments, moreover, the control input to the blower supply 119 in FIG. 3 may be reduced to a low-speed level (e.g., 0 V) by the PIB board 136 in the standby condition.

Figure 4:
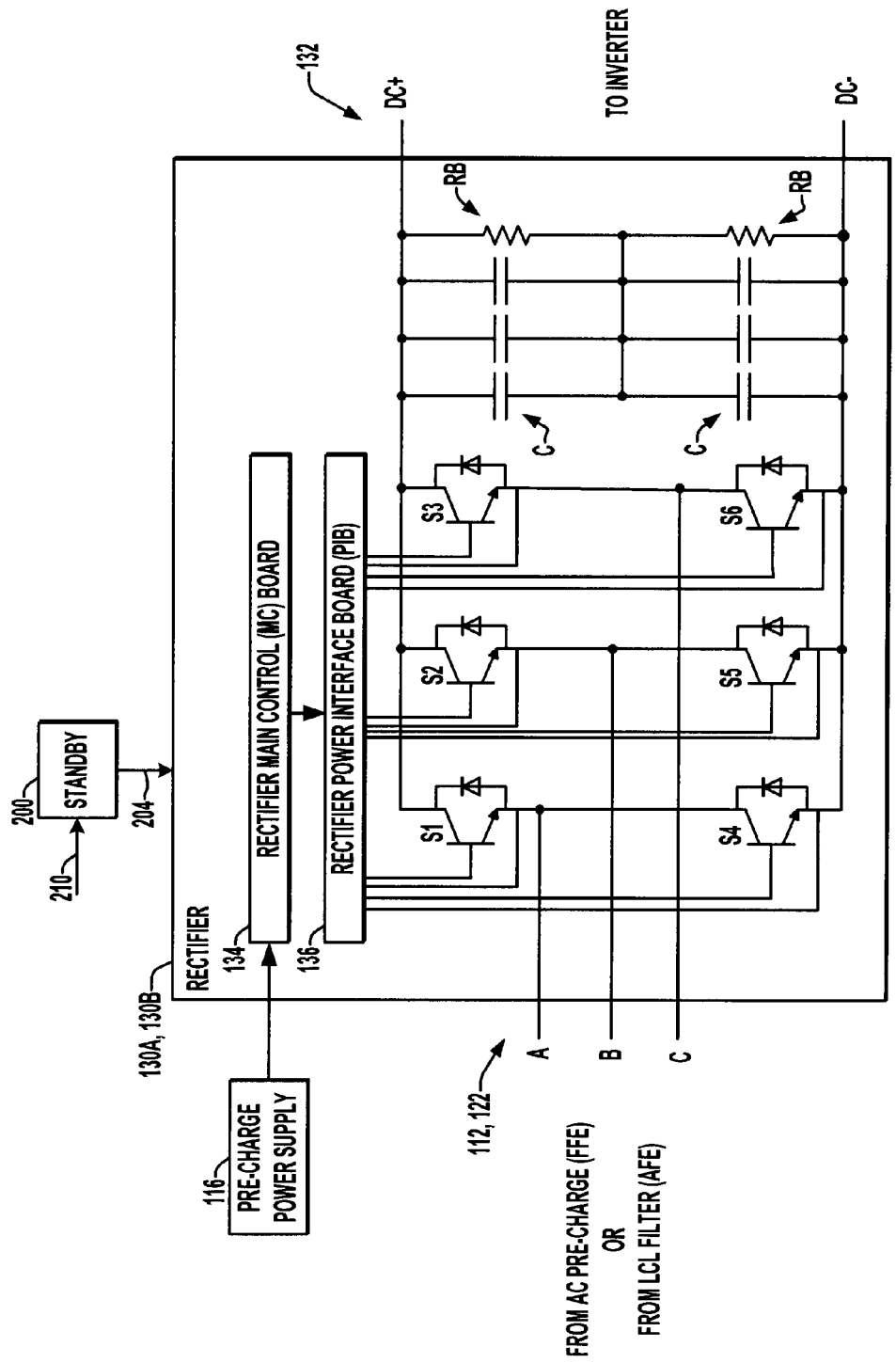
FIG. 4 is a schematic diagram illustrating further details of an exemplary rectifier in the motor drives of FIGS. 1 and 2 in which a rectifier power interface board (PIB) is operated according to the standby controller and a pre-charge power supply selectively provides power to a rectifier main control board.
Figure 5:
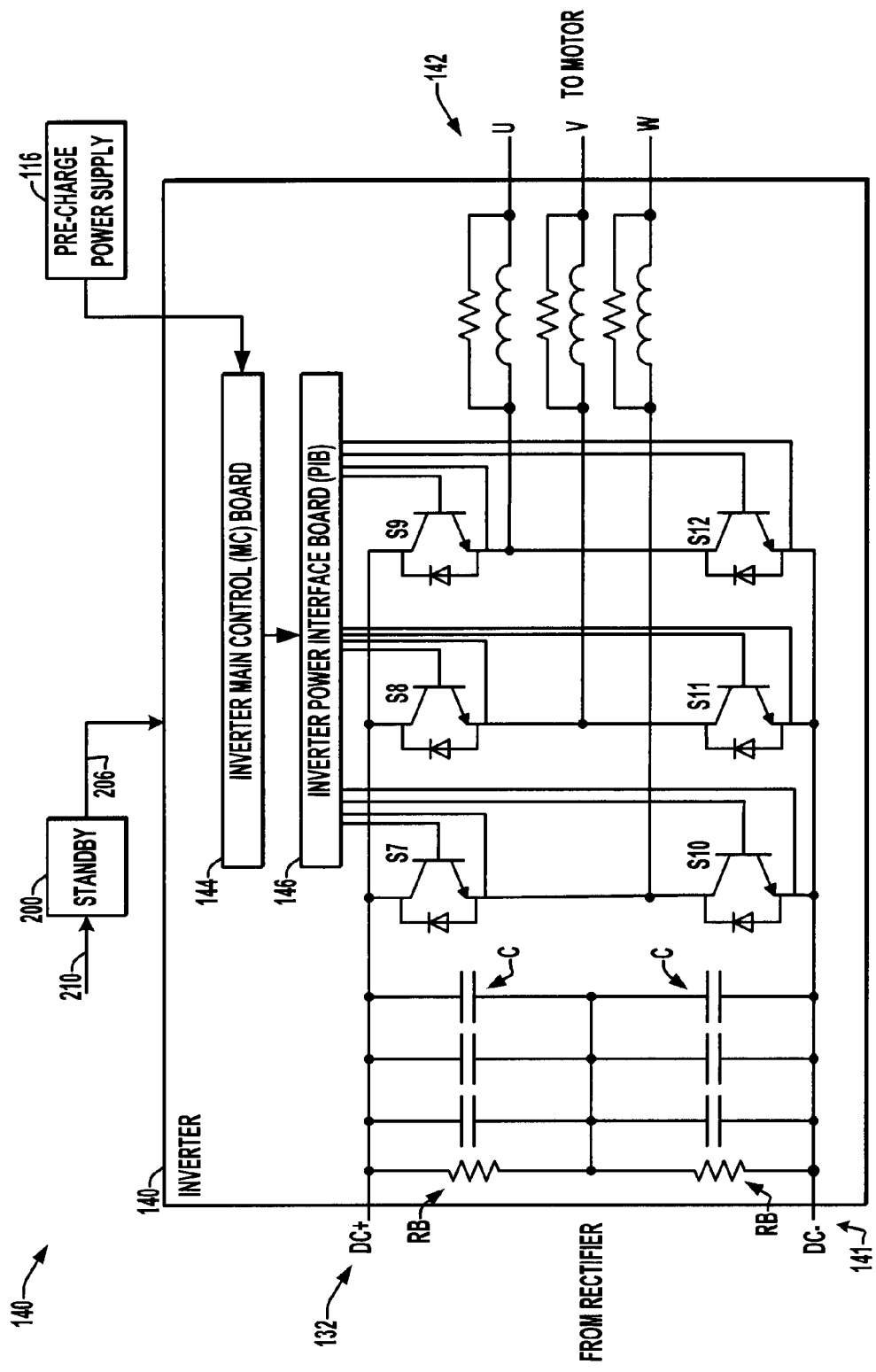
FIG. 5 is a schematic diagram illustrating further details of an exemplary inverter in the motor drives of FIGS. 1 and 2 in which an inverter power interface board (PIB) is operated according to the standby controller and the pre-charge power supply selectively provides power to an inverter main control board.

FIG. 4 illustrates further details of the exemplary rectifiers 130 in the AFE and FFE embodiments of FIGS. 1 and 2. Although illustrated is an active rectifier 130, certain embodiments (e.g., FFE motor drives, etc.) can employ a passive rectifier 130. The illustrated switching rectifier 130 in FIG. 4 includes an AC input 112, 122 receiving AC input power from the AC pre-charge apparatus 110 (in the case of an FFE drive 100B as seen in FIG. 2 above) or the AC input power is received from an intervening LCL filter for the AFE embodiment (FIG. 1). The rectifier 130 provides a DC output 132 including first and second DC output nodes (DC+ and DC−, respectively) coupled with corresponding DC current paths 132 by switched operation of a plurality of rectifier switching devices S1-S6 forming a switching network. Each of the rectifier switches S1-S6 is coupled between one of the AC input nodes ABC and one of the DC output nodes DC+, DC−, and the switches S1-S6 are operated according to switching control signals from the rectifier power interface board 136 for conversion of AC input power to DC output power. In operation, the switching control signals are generated by the rectifier main control board 134 and suitable gating control signals are driven by the power interface board 136 or a separate gate driver board (not shown) in normal operation. As mentioned above, moreover, in the case of active front end rectifier operation (FIG. 1 above), the switching control signals are provided at a frequency higher than a fundamental frequency of the AC input source 10, and the drive 100A in this case may include the LCL filter stage 120. For fundamental front end (FFE) implementations (e.g., FIG. 2 above), the main control board 134 generates the rectifier switching control signals at approximately the input fundamental frequency (or a passive rectifier 130 can be used without switching operation). As seen in the example of FIG. 4, moreover, the rectifier stage 130 may include one or more output capacitors C connected in any suitable series/parallel configuration, and the illustrated embodiment provides a center node to establish a midpoint voltage between the DC bus terminals 132, along with balancing resistances RB individually coupled between the center node and the DC output terminals 132.

As seen in FIG. 4, the standby controller 200 provides a control signal 204 by which the rectifier 130 causes the rectifier main control board 134 to cease generation of the rectifier switching control signals. At the same time, the pre-charge power supply 116 (of the pre-charge apparatus 110 in FIG. 3 above) maintains power to the main control board 134 to allow quick resumption of normal mode operation if needed. Furthermore, discontinuation of power at the rectifier input terminals ABC allows the DC bus voltage across the capacitance C to discharge, thereby conserving power during standby mode operation, wherein the discharging of the DC bus discontinues power consumption by the balancing resistors RB.

FIG. 5 illustrates an exemplary three-phase inverter 140 in the motor drives 100 of FIGS. 1 and 2, which includes a DC input 141 coupled with the DC output terminals 132 of the preceding rectifier 130, and provides an AC output 142 having a plurality of AC output nodes UVW coupleable to an AC motor load 20 (FIGS. 1 and 2 above). In the illustrated embodiment, moreover, the DC input 141 is connected to internal DC capacitances C, which can be any suitable series/parallel combination or a single capacitor, and may include a midpoint node to which internal balancing resistors RB are connected. In certain embodiments, both the output of the rectifier 130 and the input of the inverter 140 are provided with DC bus capacitance and/or balancing resistances, or such may be provided in only one of the rectifier output or the inverter input in other embodiments. In still other embodiments (not shown), the motor drive 100 may be a current source drive in which an intermediate DC link circuit is provided between the rectifier output 132 and the inverter input 141 without any bus capacitance or balancing resistances, but including one or more DC link choke devices. As noted above with respect to the exemplary rectifier 130 of FIG. 4, moreover, operation of the standby controller 200 to cause the opening of the main circuit breaker 111 in the pre-charge apparatus 110 (FIG. 3) facilitates reduction in the power consumption of the balancing resistors RB, whether provided in the rectifier 130 or in the inverter 140. In addition, the illustrated inverter 140 also includes optional output filter components, such as inductors and/or resistors, although not a strict requirement of the present disclosure.

The inverter 140 also includes an inverter switching network comprising a plurality of inverter switching devices S7-S12 individually coupled between one of the DC input nodes 141 and a corresponding one of the AC output nodes UVW 142. The inverter switches S7-S12 are operated by corresponding inverter switching control signals generated by the inverter main control (MC) board 144 and driven by the power interface board 146 (or by a separate gate driver board, not shown). As noted above, the standby controller 200 receives the standby mode command 210, and provides a signal 206 to the inverter 140, causing the inverter power interface board 146 to discontinue generation of the inverter switching control signals during standby mode operation. At the same time, however, the pre-charge apparatus 110 retains the pre-charge power supply 116 in the "on" condition, and thus the inverter main control board 144 remains powered during the standby mode. This allows the inverter to quickly resume switching operation upon resumption of the normal mode operation in the motor drive 100.

The various control components illustrated and described herein, including without limitation the standby controller 200, the pre-charge I/O board 118, the rectifier and inverter main control boards 134, 144 and components thereof may be implemented as any suitable hardware, processor-executed software, processor-executed firmware, programmable logic, and/or combinations thereof wherein the illustrated embodiment can be implemented largely in processor-executed software or firmware providing various control, signaling, and mode change management functions by which one or more of these components may receive feedback and/or input signals and/or values (e.g., setpoint(s)) and provide the switching control and mode signals to operate the switching devices S1-S6 of the rectifier 130, the switches S7-S12 of the inverter 140, and the various circuit breakers and contactors of the pre-charge apparatus 110 according to the functions described herein. In addition, these components 118, 134, 144, 200, etc., can be implemented in a single processor or one or more of these can be separately implemented in unitary or distributed fashion by two or more processor devices.

Moreover, the switching devices S1-S12 of the rectifier 130 and the inverter 140 can be any form of electronically actuatable switching devices, such as integrated gate bipolar transistors (IGBTs), silicon controlled rectifiers (SCRs), gate turn-off thyristors (GTOs), gate commutated thyristors ((GCTs) such as integrated gate commutated thyristors (IGCTs) or symmetrical gate commutated thyristors (SGCTs)), etc.

The mode control command 210 received by the standby controller 200 can be an externally generated signal or message (e.g., received from another system such as a supervisory distributed control system, network, etc., such as through and I/O board, etc.), or the mode command 210 may be set in certain embodiments by the controller 200 based on internal conditions within the motor drive 100. In addition, the various controllers of the drive 100 may be provided with various feedback information including measured input line-line or line-neutral voltages, sensed AC input line current values, measured DC link voltage values, and/or sensed AC output currents and voltages, etc. In addition, the controllers of the rectifier 130 and of the inverter 140 include suitable interface circuitry in order to receive the various input and/or feedback signals and/or values, as well as suitable driver circuitry for generating switching control signals 162, 172, 182 of suitable electrical characteristics to actuate the associated switching devices S1-S12 operated according to the signals. The motor drive 100 may also include a user interface (not shown) by which a user may interact with the drive 100 in order to set operating values (e.g., setpoints, mode command 210), view sensed operating conditions, etc.

The switching control signals for the switching devices S1-S12 of the rectifier 130 and/or inverter 140 may be provided using any suitable switching scheme, which may involve one or more pulse width modulation (PWM) techniques including without limitation space vector modulation (SVM), selective harmonic illumination (SHE), etc. In addition, the various control components within the motor drive 100 may operate during normal mode according to one or more setpoints or other signals/values provided by another one of the control components. For instance, the inverter control during normal motoring operation may provide a DC voltage setpoint signal or value to the rectifier 130, with the rectifier 130 regulating its output voltage according to the setpoint from the inverter 140. Also, in certain embodiments, the drive 100 may be operated so as to provide regenerative control of power flowing from the load side to the source 10 by selective operation of the switching components of the rectifier 130 and/or of the inverter 140.

Figure 6:
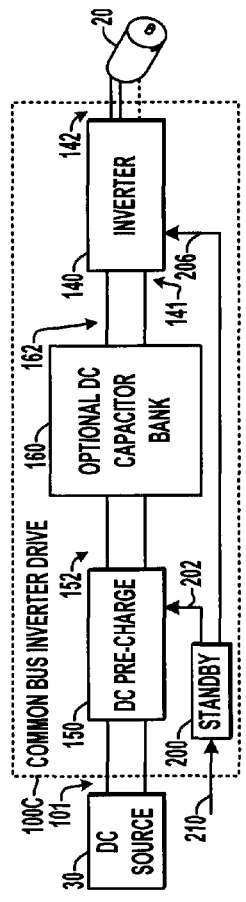
FIG. 6 is a simplified schematic diagram illustrating an exemplary common bus inverter drive having a DC pre-charge apparatus with a DC circuit breaker operated according to a standby controller in accordance with further aspects of the disclosure.
Figure 7:
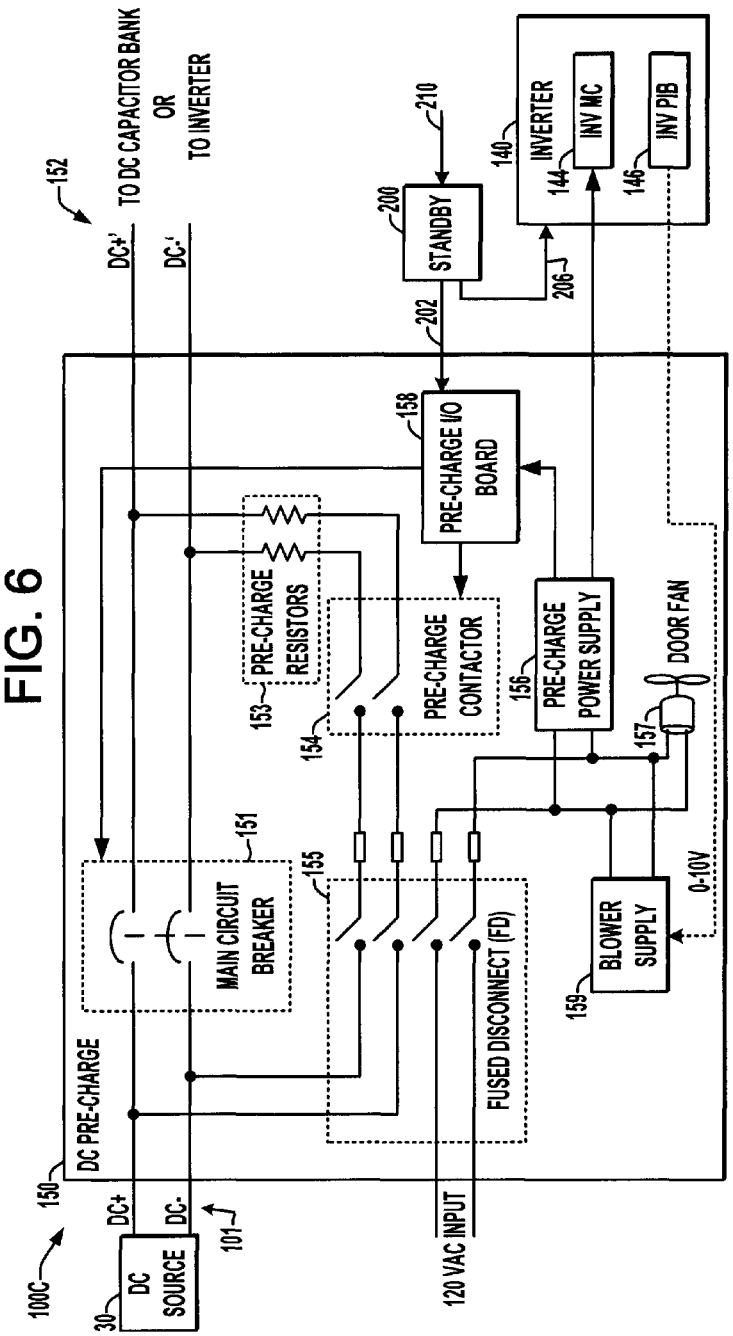
FIG. 7 is a schematic diagram illustrating further details of an exemplary DC pre-charge apparatus in the common bus inverter drive of FIG. 6, in which the DC main circuit breaker selectively removes power from an inverter while maintaining power to a pre-charge power supply and a blower supply during standby mode operation in accordance with the present disclosure.

Referring also to FIGS. 6 and 7, another embodiment of a motor drive 100 is illustrated, in this case a "common bus inverter" drive 100C. In this embodiment, the motor drive 100C receives a DC input at a drive input 101 from a DC power supply or source 30, and this DC input power is used to drive an inverter 140. The inverter 140 may be constructed similar to that described above in connection with FIG. 5, and this form of motor drive 100C allows a single DC source 30 to provide a shared (common) DC bus for use by two or more motor drives 100C. In certain embodiments, the common bus inverter drive 100C may include one or both of an initial DC pre-charge apparatus 150 providing an output 152 and/or an optional DC capacitor bank 160 with a DC output 162 provided as an input 141 to the inverter 140. In addition, the illustrated common bus inverter drive 100C includes a standby controller 200 substantially as described above.

As seen in FIG. 7, the illustrated DC pre-charge apparatus 150 has input terminals 101 receiving DC input power from the source 30, and these are coupled to DC output terminals 152 (DC+' and DC−', respectively) which provide DC power to the inverter 140 directly or through an optional DC capacitor bank 160 (FIG. 6). As seen in FIG. 6, moreover, the standby controller 200 receives a standby mode command 210 (e.g., from an external source in certain embodiments, such as via an I/O card), and in response, provides mode control signals and/or messages 202 and 206 to the pre-charge apparatus 150 and the inverter 140, respectively. As best seen in FIG. 7, the pre-charge apparatus 150 includes a main circuit breaker 151 (a DC breaker in this embodiment) which operates in a first mode to connect the DC source 30 with the pre-charge output terminals 152 or in a second mode to disconnect the DC drive input 101 from the output terminals 152.

Pre-charge circuitry is also provided in this embodiment, including a pre-charge contactor 154 connected in series with one or more pre-charge resistors 153 in a series branch that is parallel with the main circuit breaker 151. As with the above described AC pre-charge apparatus 110 (e.g., FIG. 3), the DC pre-charge apparatus 150 may include a fused disconnect 155 including normally-closed contacts between the DC input terminals 101 and the contacts of the pre-charge contactor 154. The common bus inverter drive 100C, moreover, may include a user-supplied 120 VAC input, which may also pass through corresponding contacts of the fused disconnect 155, for powering a pre-charge power supply 156, a door fan 157, and/or a blower supply 159. The pre-charge power supply 156 provides DC output power to a pre-charge I/O board 158 (similar in most respects to the I/O board 118 described above in connection with FIG. 3), and also provides DC output power (e.g., 24 VDC) to an inverter MC board 144 of the inverter 140.

The pre-charge I/O board 158 controls the operating state of the main circuit breaker 151 and the pre-charge contactor 154 to implement normal, pre-charge, and standby modes generally as discussed above. In the normal mode, the pre-charge I/O board 158 maintains the main circuit breaker 151 in the on or closed position to provide DC current from the source 30 to the output terminals 152, and in a pre-charge mode opens the main circuit breaker 151 and closes the pre-charge contactor 154 in order to conduct current initially through the pre-charge resistors 153 to limit inrush current while charging the optional DC capacitor bank 160.

In response to receipt of a standby command signal or message 210, the standby controller 200 provides a signal 202 to the pre-charge I/O board 158, which in turn opens both the main circuit breaker 151 and the pre-charge contactor 154, whereby no current flows from the DC source 30 to the output terminals 152. The pre-charge power supply 156, however, is still connected through the (normally closed) fused disconnect 155 to the user-supplied 120 VAC input, and thus continues to provide a DC output voltage (e.g., 24 VDC) to the pre-charge I/O board 158 and to the inverter power interface board 146. Also, the standby controller 200 provides the standby signal 206 to the inverter 140, causing the inverter main control board 144 to discontinue provision of inverter switching control signals to the inverter switching devices (e.g. S7-S12 as shown in FIG. 5 above). At the same time, as also seen in FIG. 5, the pre-charge power supply 156 of the DC pre-charge apparatus 150 provides power to the inverter MC board 144, whereby this board remains powered to facilitate quick resumption of normal mode operation of the drive 100C. Moreover, a door fan 157 and a blower supply 159 of the motor drive 100C remain connected through the fused disconnect 155 to the 120 VAC input, although not a strict requirement of the present disclosure. Other embodiments are possible in which the fused disconnect 155 is omitted. In certain embodiments, the blower supply 159 is equipped with a control input receiving a control signal (e.g., 0-10 V) from the inverter PIB board 146, and the PIB board 146 in such embodiments may be configured to reduce the level of the control signal (e.g., to 0 V or some other low-speed level) during standby operation in order to further conserve power in the system 100.

Figure 8:
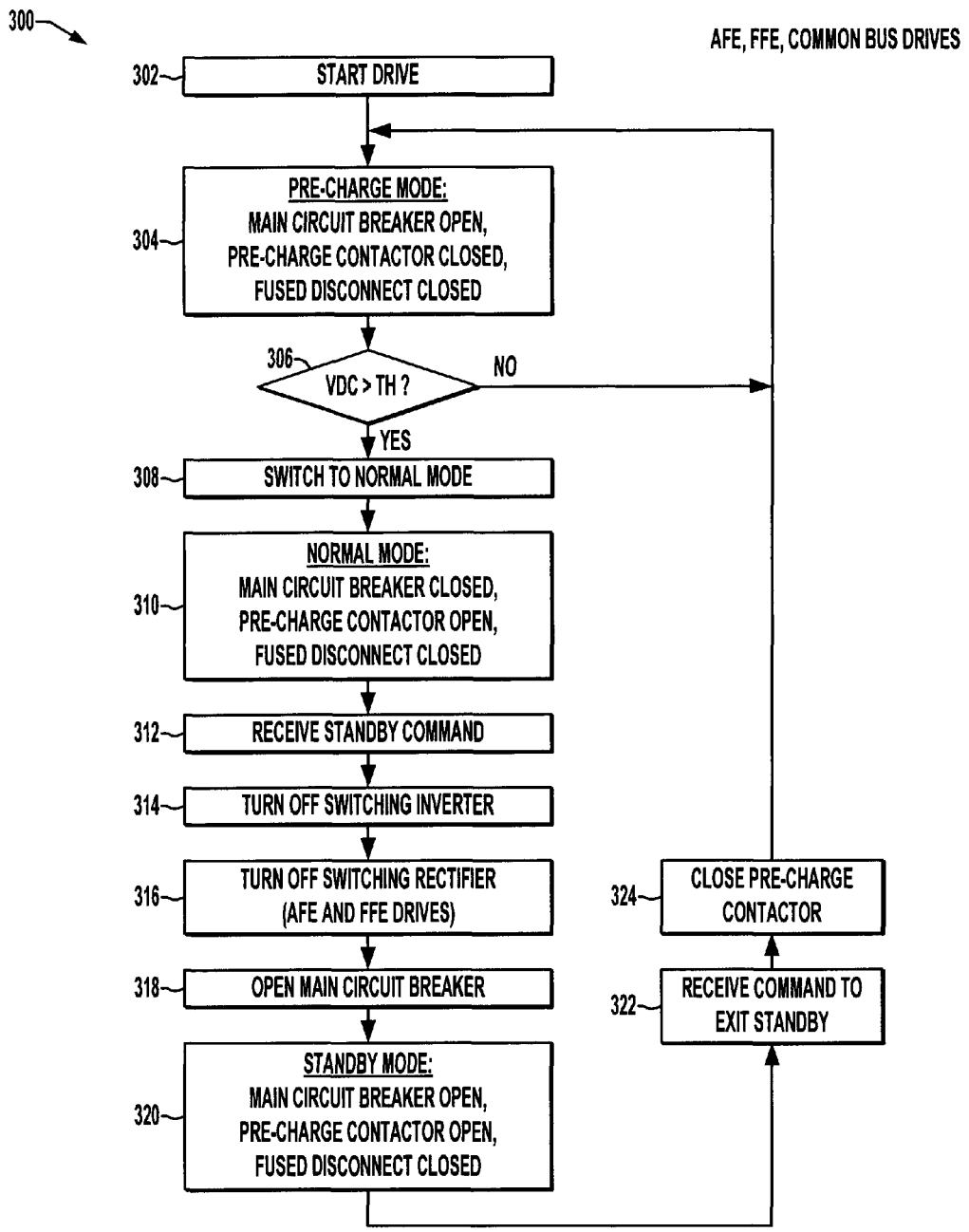
FIG. 8 is a flow diagram illustrating an exemplary method for operating a motor drive in normal and standby modes in accordance with further aspects of the disclosure.

FIG. 8 illustrates an exemplary method 300 for operating a motor drive, which finds utility in association with multi-mode operation of the above described AFE, FFE and/or common bus inverter type motor drives 100A-100C. Although the exemplary method 300 of FIG. 8 and the method 400 of FIG. 11 below are illustrated and described below in the form of a series of acts or events, the various methods of the present disclosure are not limited by the illustrated ordering of such acts or events except as specifically set forth herein. In this regard, except as specifically provided in the claims, some acts or events may occur in different order and/or concurrently with other acts or events apart from those acts or events and ordering illustrated and described herein, and not all illustrated steps may be required to implement a process or method in accordance with the present disclosure. The disclosed methods, moreover, may be implemented in hardware, processor-executed software, programmable logic, etc., or combinations thereof, in order to provide the described functionality, wherein these methods can be practiced in the above described motor drives 100, although the presently disclosed and methods are not limited to the specific applications and implementations illustrated and described herein.

At 302 in FIG. 8, the motor drive 100 is started, and operation begins in a pre-charge mode at 304 with the main circuit breaker or other switching device or devices (e.g., precharge breakers 111 or 151 in FIGS. 3 and 7 above) in the non-conducting or "open" condition. The pre-charge mode at 304 also involves maintaining a pre-charge contactor (e.g. 114, 154 in FIGS. 3 and 7) and any provided fused disconnect (e.g., 115, 155) in the closed or conductive state. A determination is made at 306 in FIG. 8 as to whether a DC bus voltage VDC is greater than a predetermined threshold "TH". If not (NO at 306), the pre-charge mode continues at 304. Once the DC bus voltage exceeds the threshold (YES at 306), the process 300 proceeds to switch to a "normal" operating mode at 308 (e.g., using the above-described standby controller 200). The normal mode proceeds at 310 with the main circuit breaker closed, the pre-charge contactor open, and any provided fused disconnect closed.

At 312 in FIG. 8, a standby command is received (e.g., standby command 210), and the switches of the inverter 140 are turned off at 314, such as by the inverter main control board 144 discontinuing generation of inverter switching control signals, while the inverter power interface board 146 may remain powered to facilitate quick resumption of normal mode operation if needed. At 316, the switching rectifier 130 (for the case of AFE or FFE drives 100A and 100B) is turned off. In the above-described embodiments, for instance, the switching operation of the associated rectifier switching devices S1-S6 is discontinued by the main control board 134, although the power interface board 136 may remain powered. At 318 in FIG. 8, the main circuit breaker is opened, such as by the pre-charge I/O board 118, 158 based on receipt of the signal 202 from the standby controller 200, and the drive 100 thereafter operates in the standby mode at 320 with the main breaker opened, the pre-charge contactor opened, and the fused disconnect closed. This "standby" mode operation continues until receipt of a command at 322 in order to exit the standby mode (e.g., received by the standby controller 200 above). In response, the pre-charge contactor (e.g., 114, 154 in FIGS. 3 and 7 above) is closed at 324, and the process 300 returns to the pre-charge mode at 304 as described above. Referring now to the FIGS. 9-11, further aspects of the disclosure relate to an exemplary motor drive 100D, which in certain embodiments may be a non-regenerative six pulse motor drive having an AC input 101 receiving power from an AC source 10 and providing this (directly or indirectly) to the input of a rectifier 130, which can be generally configured as described in connection with FIG. 4 above. The rectifier 130 provides a DC output 132 as an input 141 to an inverter 140 that provides an AC output 142 to drive a motor load 20 as previously set forth with respect to FIG. 5 above. The drive 100D also includes a standby controller 200 receiving a standby command 210 and providing signals 204 to the rectifier 130 and 206 to the inverter 140, respectively. As best seen in FIG. 10, moreover, the rectifier 130 in this embodiment provides a contactor 131 disposed between two of the three AC input lines RST and a primary of a transformer that drives a converter gate firing board 138 and a blower motor 139 in accordance with a signal 202 from the standby controller 200. The converter gate firing board 138 in this embodiment provides switching control signals to SCR type rectifier switching devices that convert the input AC from the power source 10 into DC power providing a bus voltage across DC output terminals 132. In addition, the DC output circuitry of the rectifier 130 may include one or more DC bus capacitances C configured in any suitable series/parallel architecture, as well as one or more balance resistors RB. The output 132 of the rectifier provides the DC input 141 to the inverter 140, where the inverter 140 may be constructed generally as shown in FIG. 5 above.

The motor drive 100D of FIG. 10 operates in a normal mode as well as a standby mode. In normal mode operation, the contactor 131 is closed, and the converter gate firing board 138 provides suitable SCR switching control signals to cause conversion of the AC input power to provide DC power to the inverter input 141. The inverter 140, in turn, converts this input DC power into AC output currents and voltages suitable for driving a motor load 20. In response to receipt of the standby signal 210, the standby controller 200 provides a signal 202 to the contactor 131, causing the contactor 131 to open. In certain embodiments, moreover, the contactor 131 is opened by the controller 200 only after the DC bus voltage VDC has decayed to a predetermined level. In addition, the standby controller 200 provides a signal 204 to the converter gate firing board 138, which in turn stops providing switching control signals to the rectifier SCRs, and the signal 204 may be provided to cease rectifier switching prior to the provision of the signal 202 to open the contactor 131 in certain embodiments. Opening the contactor 131 in the illustrated example shuts down both the blower 139 and the converter gate firing board 138 for further power savings during standby operation. Once the converter gate firing board 138 stops providing switching control signals to the rectifier SCRs, the DC bus across the output terminals 132 will begin to discharge, for instance, through the balancing resistors RB. Also, the standby controller 200 provides a signal 206 to the inverter 140. As discussed above in connection with the example of FIG. 5, the inverter 140 receives the signal 206, and a switching control component (e.g., PIB board 146 in FIG. 5) discontinues switching control signals to the inverter switching devices. By this standby mode operation, the controller 200 conserves power in the motor drive 100D.

Figure 9:
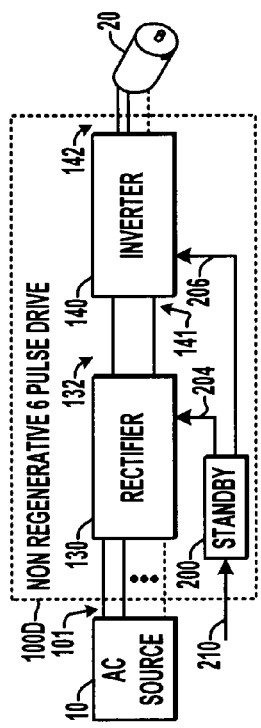
FIG. 9 is a simplified schematic diagram illustrating an exemplary non-regenerative six pulse drive with a standby controller in accordance with further aspects of the present disclosure.
Figure 10:
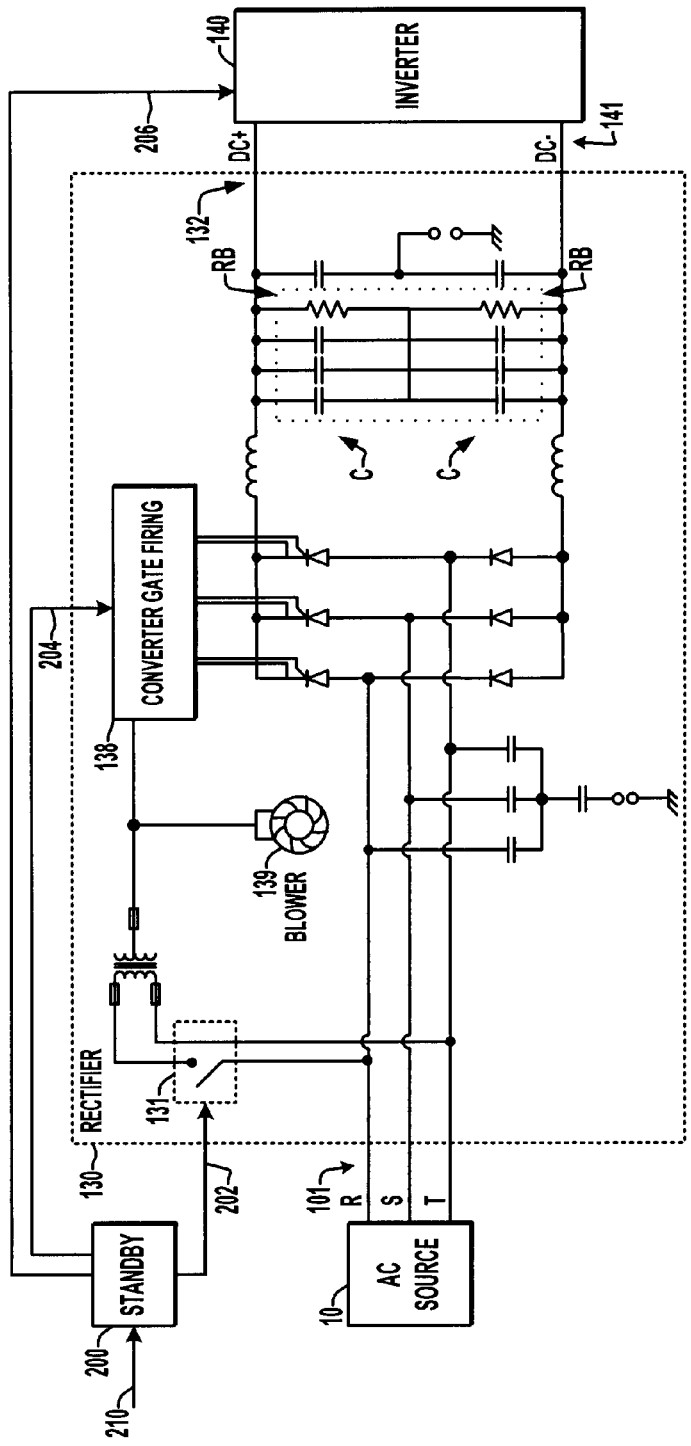
FIG. 10 is a schematic diagram illustrating further details of the motor drive of FIG. 9 including a contactor for selectively removing power to a converter gate firing circuit during standby mode operation.
Figure 11:
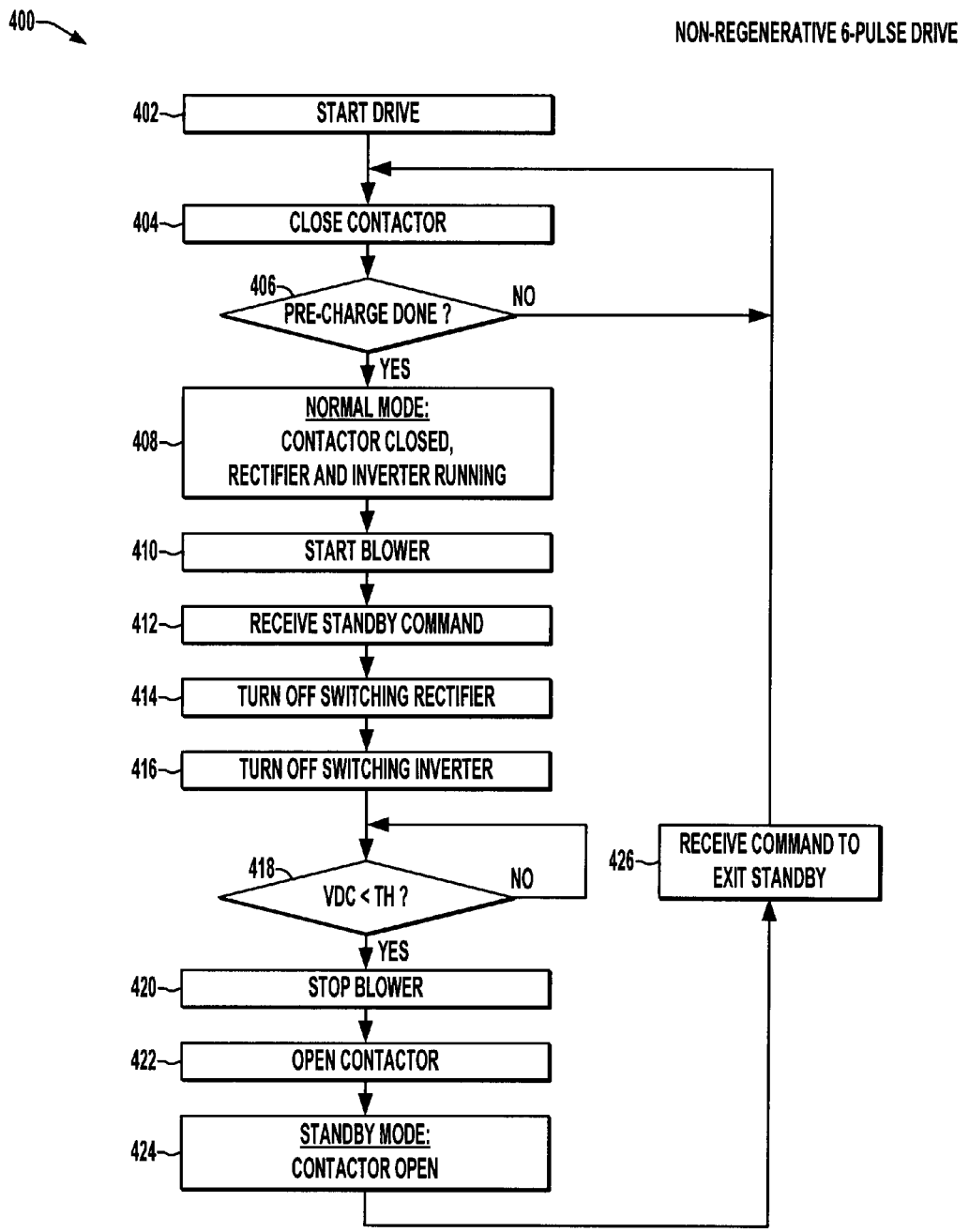
FIG. 11 is a flow diagram illustrating an exemplary method for operating the non-regenerative motor drive of FIGS. 9 and 10 in accordance with the present disclosure.

FIG. 11 illustrates another exemplary method for motor drive operation 400, which can be employed in the motor drive 100D of FIGS. 9 and 10 above. At 402 in FIG. 11, the drive 100D is started, and the contactor 131 is closed at 404. The drive 100D proceeds to a pre-charge mode of operation in certain embodiments, and a determination is made at 406 as to whether the pre-charge sequence is completed, such as by detecting that the DC bus voltage across the bus capacitance C has charged to a predefined threshold level. Once this condition is satisfied (YES at 406), the motor drive 100D operates in a "normal" mode at 408 and the blower motor 139 is started at 410, with the contactor closed and the rectifier and inverter operating for conversion of AC input power to intermediate DC and DC power conversion into AC output power to drive the motor load 20.

A standby command is received at 412, and the controller 200 turns off the rectifier at 414 (e.g., by providing the signal 204 to the converter gate firing board 138, causing the board 138 to stop firing the SCR's) and turns off the switching inverter at 416 (e.g., via signal 206 to cause the inverter 142 discontinue the inverter switching control signals). A determination is made at 418 as to whether the DC bus voltage VDC is less than a predetermined threshold. Once this condition has been met (YES at 418), the blower 139 is stopped at 420 (e.g., by the standby controller 200 or by the converter gate firing board 138 or other control component of the rectifier 130) and the contactor 131 is opened at 422 (e.g. by the standby controller 200 providing the signal 202) thereby powering down the blower motor 139 as well as the converter gate firing board 138 for further power savings during standby mode operation. The standby mode operation continues at 424 with the contactor 131 open until a command is received at 426 to exit the standby mode. At this point, the process 400 returns to close the contactor at 404 as described above to begin the pre-charge mode until normal mode can be resumed at 410.

Further aspects of the present disclosure provide computer readable mediums with computer executable instructions for implementing the above-described processes and methods. The computer readable medium may be, without limitation, a computer memory, a memory within a power converter control system, a CD-ROM, floppy disk, flash drive, database, server, computer, etc., which has computer executable instructions for performing the processes disclosed above. The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, logic, or combinations thereof, which performs the specified function of the described component (i.e., that is functionally equivalent), even though not structurally equivalent to the disclosed structure which performs the function in the illustrated implementations of the disclosure. Moreover, the various control components may be implemented using computer-executable instructions for carrying out one or more of the above illustrated and described control operations, steps, tasks, where the instructions are included in a non-transitory computer-readable medium. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A motor drive operative in a normal mode and a standby mode, the motor drive, comprising:
   a drive input receiving electrical input power from a power source;
   an inverter comprising a DC input coupled with first and second DC current paths, an AC output with a plurality of AC output nodes for supplying power to a motor, and an inverter switching network comprising a plurality of inverter switching devices individually coupled between one of the DC current paths and one of the AC output nodes;
   at least one switching device coupled between the drive input and the DC input of the inverter, the at least one switching device operative in a first mode to allow input power to flow from the power source to the inverter and in a second mode to prevent input power from flowing from the power source to the inverter; and
   a standby controller operatively coupled with the at least one switching device to place the at least one switching device in the first mode when the motor drive is in the normal operating mode and to place the at least one switching device in the second mode while maintaining power to at least one control component of the motor drive when the motor drive is in the standby operating mode.

2. The motor drive of claim, 1, further comprising a rectifier comprising an AC input having a plurality of AC input nodes coupled with the drive input to receive AC electrical input power, a DC output with first and second DC output nodes coupled with the first and second DC current paths, and a rectifier switching network including a plurality of rectifier switching devices individually coupled between one of the AC input nodes and one of the first and second DC output nodes; and wherein the at least one switching device is coupled between the drive input and the AC input nodes of the rectifier.

3. The motor drive of claim 2, comprising a pre-charge apparatus, the pre-charge apparatus including:
   the at least one switching device coupled between the drive input and the AC input of the rectifier, and
   a pre-charge circuit comprising a pre-charge switching device and at least one pre-charge resistor coupled in series with one another, the pre-charge circuit coupled in parallel with the at least one switching device between the drive input and the DC input of the inverter, the pre-charge switching device operative in a first mode to allow input power to flow from the power source through the at least one pre-charge resistor and in a second mode to provide input power from flowing through the at least one pre-charge resistor;
   wherein the pre-charge apparatus is operative to place the at least one switching device in the second mode and to place the pre-charge switching device in the first mode when the motor drive is in a pre-charge mode, and wherein the pre-charge apparatus is operative to place the at least one switching device in the first mode and to place the pre-charge switching device in the second mode when the motor drive is in the normal mode.

4. The motor drive of claim 3, wherein the pre-charge apparatus is an AC pre-charge apparatus; and wherein the at least one switching device is an AC circuit breaker coupled between the drive input and the AC input of the rectifier.

5. The motor drive of claim 3, comprising a power supply with an input coupled in the pre-charge circuit between the drive input and the pre-charge switching device, the power supply operative to provide control power in the motor drive when the motor drive is in the standby mode.

6. The motor drive of claim 3, wherein the rectifier is an active front end (AFE) rectifier operating the rectifier switching devices at a frequency at least twice a fundamental frequency of the power source, further comprising a filter circuit coupled between the at least one switching device and the AC input of the rectifier.

7. The motor drive of claim 3, wherein the rectifier is a fundamental front end rectifier operating the rectifier switching devices at a frequency at or near a fundamental frequency of the power source.

8. The motor drive of claim 2, comprising a power supply with an input coupled between the drive input and the at least one switching device, the power supply operative to provide control power in the motor drive when the motor drive is in the standby mode.

9. The motor drive of claim 1, comprising a pre-charge apparatus, the pre-charge apparatus including:
   the at least one switching device coupled between the drive input and the DC input of the inverter, and
   a pre-charge circuit comprising a pre-charge switching device and at least one pre-charge resistor coupled in series with one another, the pre-charge circuit coupled in parallel with the at least one switching device between the drive input and the DC input of the inverter, the pre-charge switching device operative in a first mode to allow input power to flow from the power source through the at least one pre-charge resistor and in a second mode to provide input power from flowing through the at least one pre-charge resistor;
   wherein the pre-charge apparatus is operative to place the at least one switching device in the second mode and to place the pre-charge switching device in the first mode when the motor drive is in a pre-charge mode, and wherein the pre-charge apparatus is operative to place the at least one switching device in the first mode and to place the pre-charge switching device in the second mode when the motor drive is in the normal mode.

10. The motor drive of claim 9, wherein the pre-charge apparatus is an AC pre-charge apparatus; and wherein the at least one switching device is an AC circuit breaker coupled between the drive input and the DC input of the inverter.

11. The motor drive of claim 9, comprising a power supply with an input coupled in the pre-charge circuit between the drive input and the pre-charge switching device, the power supply operative to provide control power in the motor drive when the motor drive is in the standby mode.

12. The motor drive of claim 9, wherein the drive input is operative to receive DC electrical input power from a DC power source; wherein the pre-charge apparatus is a DC pre-charge apparatus; and wherein the at least one switching device is a DC circuit breaker coupled between the drive input and the DC input of the inverter.

13. The motor drive of claim 1, comprising a power supply with an input coupled with the drive input, the power supply operative to provide control power in the motor drive when the motor drive is in the standby mode.

14. The motor drive of claim 1, wherein the drive input is operative to receive DC electrical input power from a DC power source; and wherein the at least one switching device is a DC circuit breaker coupled between the drive input and the DC input of the inverter.

15. The motor drive of claim 1, further comprising a blower supply with an input coupled between the at least one switching device and the DC input of the inverter.

16. A motor drive operative in a normal mode and a standby mode, the motor drive, comprising:
    a drive input receiving AC electrical input power from a power source;
    a rectifier comprising an AC input having a plurality of AC input nodes coupled with the drive input to receive AC electrical input power from the power source, a DC output with first and second DC output nodes coupled with first and second DC current paths, a rectifier switching network including a plurality of rectifier switching devices individually coupled between one of the AC input nodes and one of the first and second DC output nodes, and a rectifier controller operative to selectively provide rectifier switching control signals to the rectifier switching devices to convert the AC electrical input power into DC output power;
    an inverter comprising a DC input coupled with the first and second DC current paths, an AC output with a plurality of AC output nodes for supplying power to a motor, and an inverter switching network comprising a plurality of inverter switching devices individually coupled between one of the DC current paths and one of the AC output nodes;
    at least one switching device coupled between the drive input and the rectifier controller, the at least one switching device operative in a first mode to allow input power to flow from the power source to the rectifier controller and in a second mode to prevent input power from flowing from the power source to the rectifier controller; and
    a standby controller operatively coupled with the at least one switching device to place the at least one switching device in the first mode when the motor drive is in the normal operating mode and to place the at least one switching device in the second mode when the motor drive is in the standby operating mode.

17. The motor drive of claim 16, further comprising a blower supply with an input coupled with the at least one switching device, wherein the at least one switching device is operative in the first mode to allow input power to flow from the power source to the blower supply when the motor drive is in the normal operating mode, and wherein the at least one switching device is operative in the second mode to prevent input power from flowing from the power source to the blower supply when the motor drive is in the standby mode.

18. A method for operating a motor drive, the method comprising:
    providing electrical power through at least one switching device from a power supply to at least one of a rectifier and an inverter of the motor drive in a normal operating mode;
    receiving a standby command; and
    responsive to receiving the standby command, changing an operating mode of at least one switching device to disconnect the power supply from the at least one of the rectifier and the inverter.

19. The method of claim 18, further comprising:
    receiving a command to exit a standby mode;
    responsive to receiving the command to exit the standby mode, changing the operating mode of the at least one switching device to resume provision of electrical power to the at least one of the rectifier and the inverter.

20. A non-transitory computer readable medium with computer executable instructions for operating a motor drive, the computer readable medium comprising computer executable instructions for:
    providing electrical power through at least one switching device from a power supply to at least one of a rectifier and an inverter of the motor drive in a normal operating mode;
    receiving a standby command; and
    responsive to receiving the standby command, changing an operating mode of the at least one switching device to disconnect the power supply from the at least one of the rectifier and the inverter.

* * * * *